United States Patent
Lee

(10) Patent No.: US 7,178,245 B1
(45) Date of Patent: Feb. 20, 2007

(54) GARDENING SHEARS HAVING ENERGY-SAVING EFFECT

(75) Inventor: Mike C. Lee, Taipei (TW)

(73) Assignee: Duracraft Products Co., Ltd., Taipei (TW)

( * ) Notice: Subject to any disclaimer, the term of this patent is extended or adjusted under 35 U.S.C. 154(b) by 0 days.

(21) Appl. No.: 11/375,310

(22) Filed: Mar. 14, 2006

(51) Int. Cl.
*B26B 13/00* (2006.01)

(52) U.S. Cl. ............................. 30/254; 30/261; 30/262

(58) Field of Classification Search ................. 30/244, 30/245, 250, 251, 252, 254, 261, 262
See application file for complete search history.

(56) References Cited

U.S. PATENT DOCUMENTS

| | | | | |
|---|---|---|---|---|
| 3,336,668 | A | * | 8/1967 | Groom ........................ 30/239 |
| 4,980,975 | A | * | 1/1991 | Hodson ....................... 30/262 |
| 5,483,747 | A | * | 1/1996 | Thompson et al. .......... 30/254 |
| 6,598,300 | B2 | * | 7/2003 | Huang ......................... 30/262 |
| 6,725,547 | B2 | * | 4/2004 | Wu ............................. 30/254 |

* cited by examiner

*Primary Examiner*—Hwei-Siu Payer
(74) *Attorney, Agent, or Firm*—Alan D. Kamrath; Nikolai & Mersereau, P.A.

(57) ABSTRACT

A pair of gardening shears include a first handle, a first cutting member, a second cutting member, and a second handle. Thus, when the second cutting member is movable toward the first cutting member to perform the cutting action, the linking rod of the second cutting member pushes the first cutting member to drive the first cutting member to pivot about the drive arm of the mounting seat to push the first blade of the first cutting member downward, so that the first blade of the first cutting member is further movable toward the second blade of the second cutting member so as to enhance the cutting force of the first cutting member and the second cutting member thereby enhancing the working efficiency of the gardening shears.

18 Claims, 5 Drawing Sheets

GARDENING SHEARS HAVING ENERGY-SAVING EFFECT

BACKGROUND OF THE INVENTION

1. Field of the Invention

The present invention relates to a pair of gardening shears and, more particularly, to a pair of gardening shears having an energy-saving effect.

2. Description of the Related Art

A pair of conventional gardening shears in accordance with the prior art shown in FIG. 5 comprise two handles 80 pivotally connected with each other by a pivot shaft 7 and each having a distal end formed with a blade 70. Thus, when a user exerts a force on the two handles 80, the two handles 80 are movable toward each other, so that the blades 70 of the handles 80 are movable toward each other to perform a cutting action so as to cut a workpiece, such as the branch or the like. In such a manner, the handles 80 perform a linkage action by the length of each of the handles 80, so that the blades 70 of the handles 80 have a force to perform the cutting action. However, the cutting force of the blades 70 applied by the handles 80 is not large enough to cut a larger and harder workpiece, so that the user has to exert a larger force on the handles 80 so as to cut the larger and harder workpiece, thereby wasting the user's manual work, and thereby greatly causing inconvenience to the user when operating the gardening shears.

BRIEF SUMMARY OF THE INVENTION

In accordance with the present invention, there is provided a pair of gardening shears, comprising a first handle having an end portion formed with a mounting seat, the mounting seat having a first end formed with a pivot hole and a second end formed with a drive arm, a first cutting member pivotally mounted on the mounting seat and having a first end formed with an adjusting slot, a mediate portion formed with a pivot bore pivotally mounted on the drive arm of the mounting seat and a second end formed with a first blade, a second cutting member pivotally mounted on the mounting seat and having a first end formed with a pivot hole pivotally mounted on the pivot hole of the mounting seat, a mediate portion formed with a linking rod mounted in the adjusting slot of the first cutting member and a second end formed with a second blade aligning with the first blade of the first cutting member, and a second handle secured on the first end of the second cutting member to move the second cutting member and movable relative to the first handle.

The primary objective of the present invention is to provide a pair of gardening shears having an energy-saving effect.

Another objective of the present invention is to provide a pair of gardening shears, wherein when the second cutting member is movable toward the first cutting member to perform the cutting action, the linking rod of the second cutting member pushes the first end of the first cutting member upward to drive the first cutting member to pivot about the drive arm of the mounting seat to push the first blade of the first cutting member downward, so that the first blade of the first cutting member is further movable toward the second blade of the second cutting member so as to enhance the cutting force of the first cutting member and the second cutting member, thereby enhancing the working efficiency of the gardening shears.

A further objective of the present invention is to provide a pair of gardening shears, wherein the gardening shears have a two-stage linkage action, so that the gardening shears can provide a larger cutting force, thereby facilitating a user performing the cutting action, and thereby greatly saving the user's manual work.

A further objective of the present invention is to provide a pair of gardening shears, wherein the linking rod of the second cutting member is movable in the adjusting slot of the first cutting member to adjust travel of the first cutting member, so that the first cutting member is movable smoothly.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
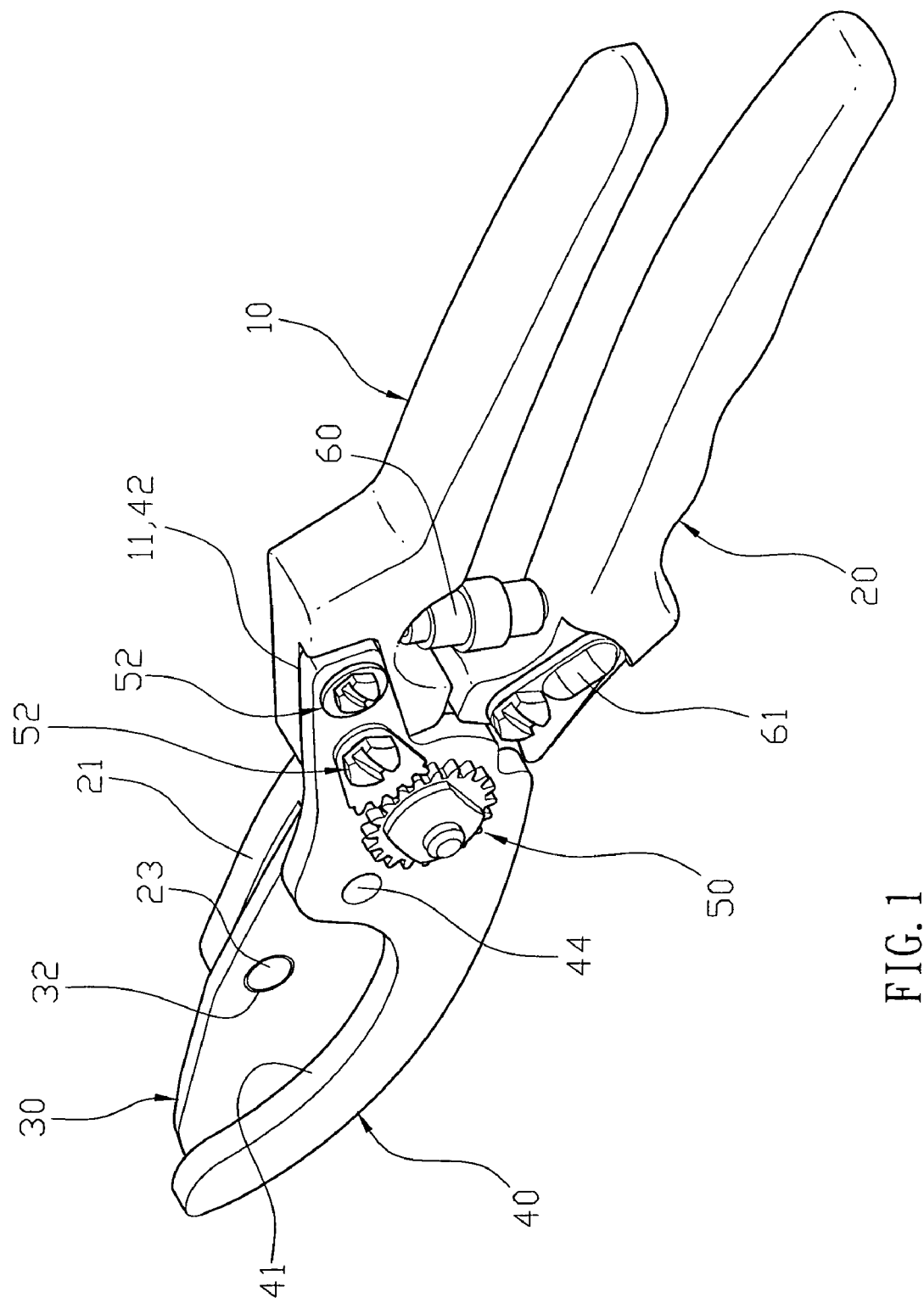
FIG. 1 is a perspective view of a pair of gardening shears in accordance with the preferred embodiment of the present invention.
Figure 2:
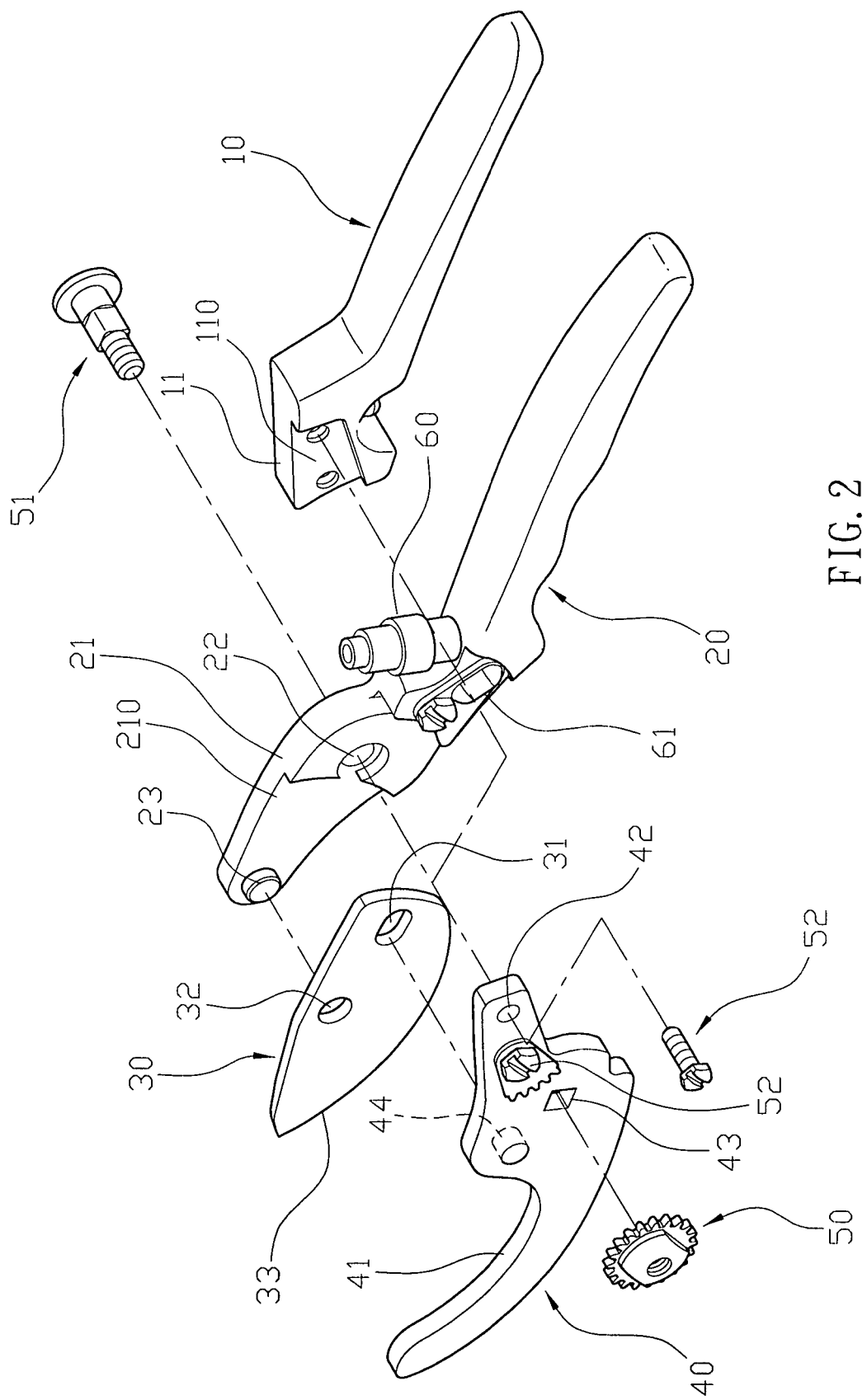
FIG. 2 is an exploded perspective view of the gardening shears as shown in FIG. 1.
Figure 3:
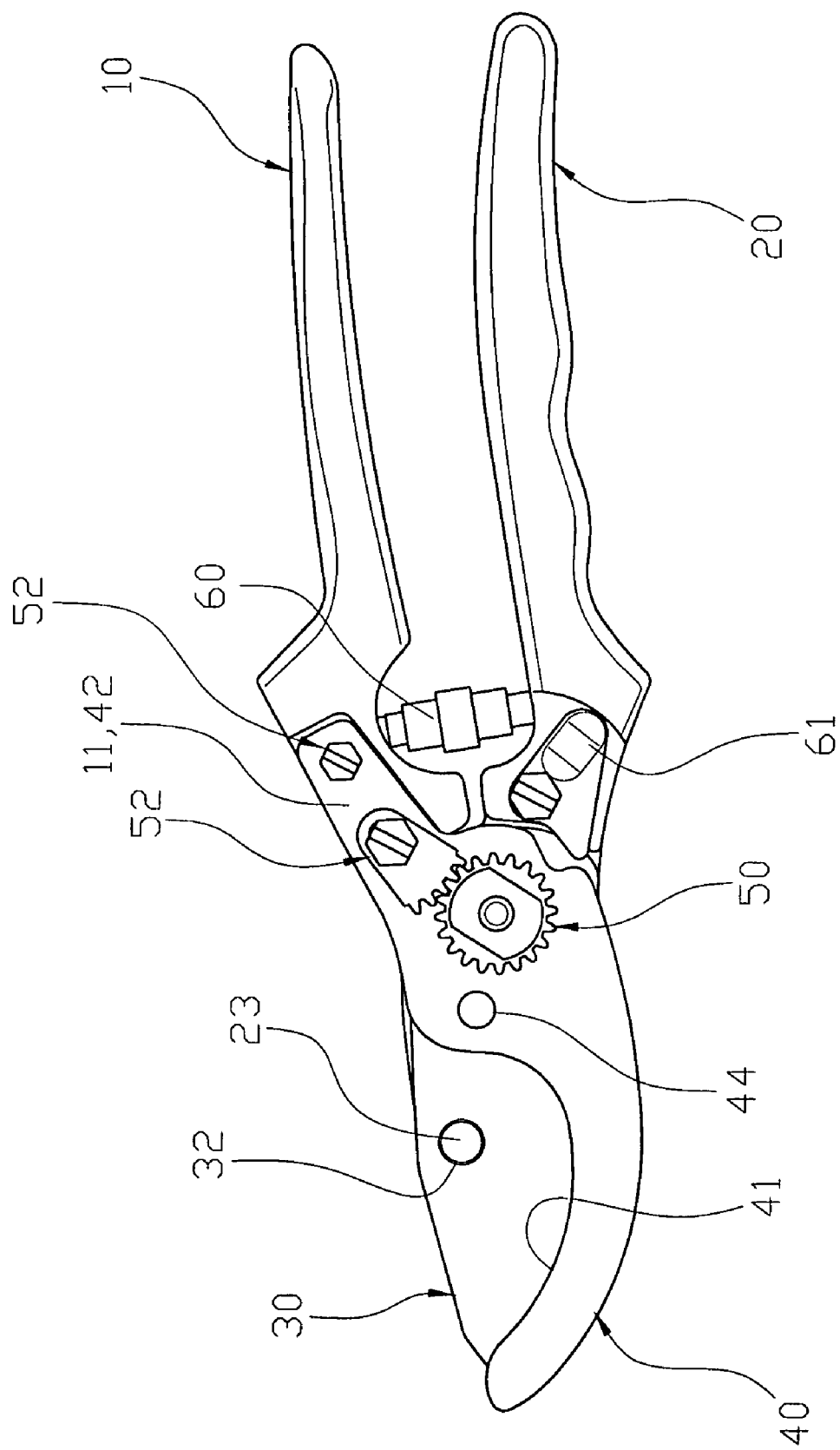
FIG. 3 is a plan view of the gardening shears as shown in FIG. 1.
Figure 4:
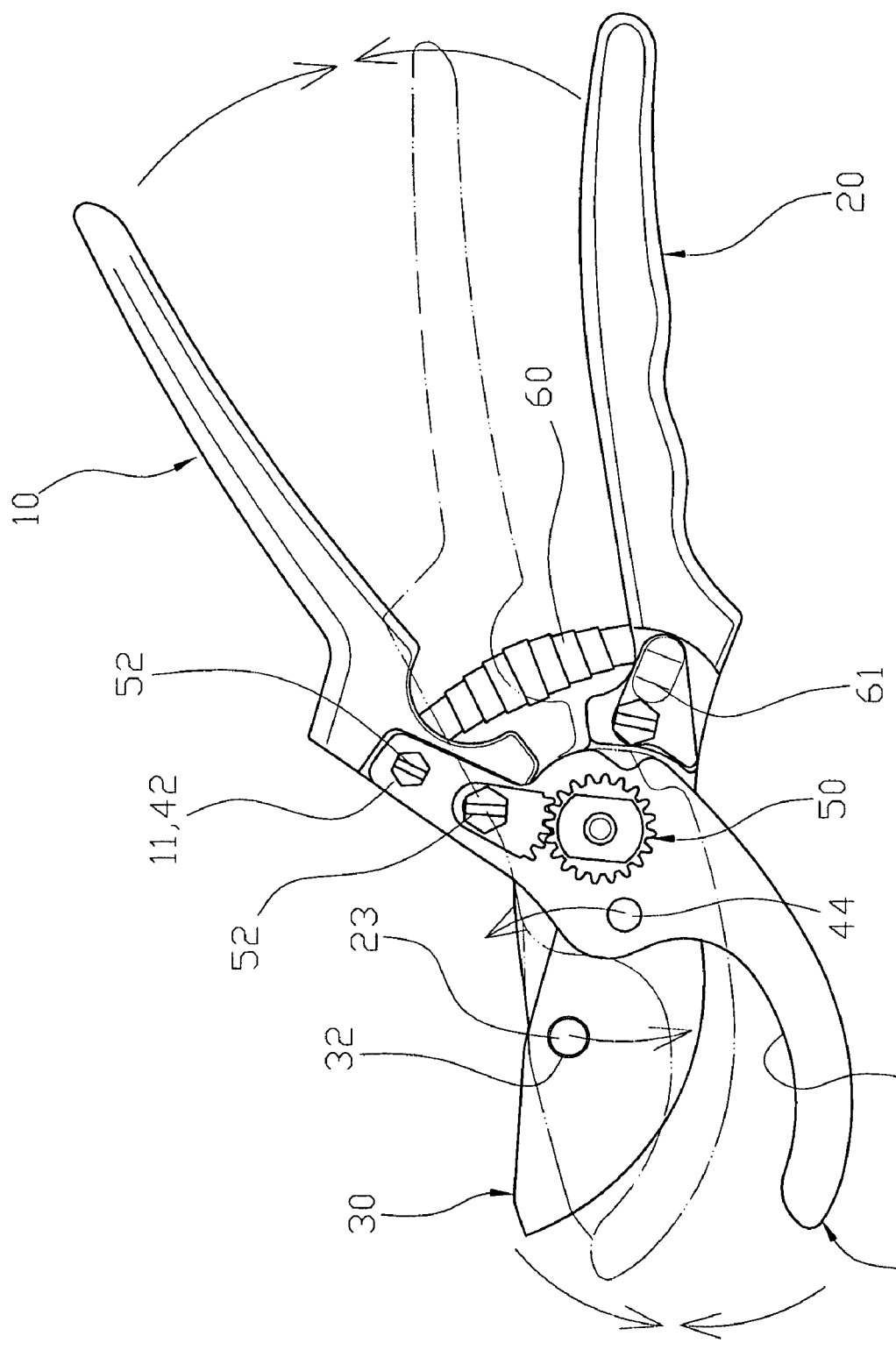
FIG. 4 is a schematic operational view of the gardening shears as shown in FIG. 3.
Figure 5:
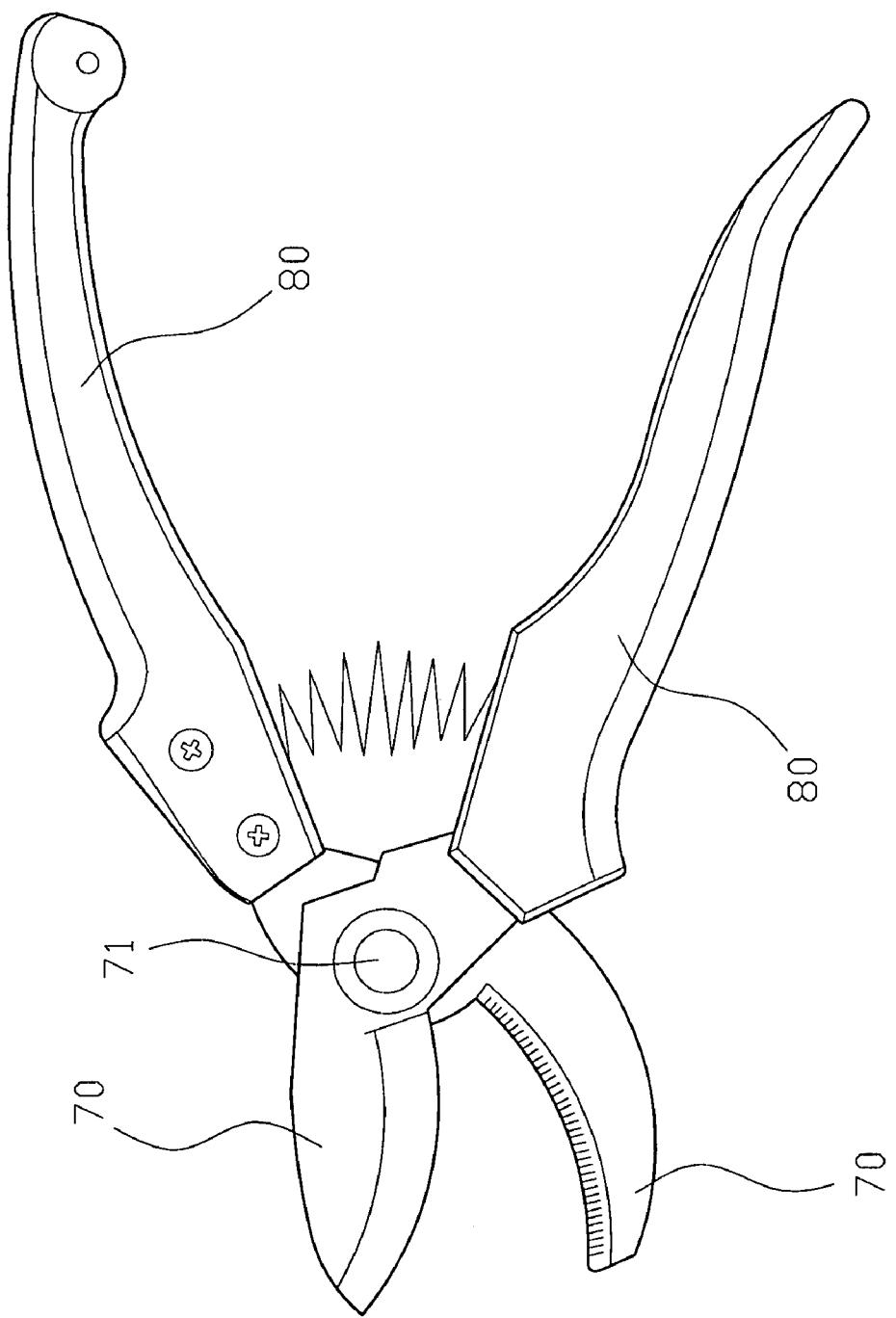
FIG. 5 is a plan view of a pair of conventional gardening shears in accordance with the prior art.

Referring to the drawings and initially to FIGS. 1–3, a pair of gardening shears in accordance with the preferred embodiment of the present invention comprise a first handle 20, a first cutting member 30, a second cutting member 40, and a second handle 10.

The first handle 20 has an end portion formed with a mounting seat 21. The mounting seat 21 has a first end formed with a pivot hole 22 located adjacent to the end portion of the first handle 20 and a second end formed with a drive arm 23. The mounting seat 21 has a recessed portion 210 for mounting the drive arm 23. The drive arm 23 is protruded outwardly from an inner side of the recessed portion 210 of the mounting seat 21.

The first cutting member 30 is pivotally mounted on the mounting seat 21 and has a first end formed with an adjusting slot 31, a mediate portion formed with a pivot bore 32 pivotally mounted on the drive arm 23 of the mounting seat 21 and a second end protruded outwardly from the mounting seat 21 and formed with a first blade 33. The first cutting member 30 is received in the recessed portion 210 of the mounting seat 21. The adjusting slot 31 of the first cutting member 30 has an elongated shape and is located adjacent to the pivot hole 22 of the mounting seat 21.

The second cutting member 40 is pivotally mounted on the mounting seat 21 and has a first end formed with a pivot hole 43 pivotally mounted on the pivot hole 22 of the mounting seat 21, a mediate portion formed with a linking rod 44 pivotally and movably mounted in the adjusting slot 31 of the first cutting member 30 and a second end protruded outwardly from the mounting seat 21 and formed with a second blade 41 aligning with the first blade 33 of the first cutting member 30. The linking rod 44 of the second cutting member 40 is protruded outwardly from an inner side of the second cutting member 40. The first end of the second cutting member 40 is formed with an outwardly extending locking portion 42. As shown in FIG. 1, the first cutting member 30 is located between the mounting seat 21 and the second cutting member 40.

The gardening shears further comprise a pivot bolt 51 extended through the pivot hole 22 of the mounting seat 21 and the pivot hole 43 of the second cutting member 40 so that the second cutting member 40 is pivotally mounted on the mounting seat 21, and a locking nut 50 screwed onto the pivot bolt 51 and rested on the pivot bolt 51.

The second handle 10 is secured on the first end of the second cutting member 40 to move the second cutting member 40 and is movable relative to the first handle 20. The second handle 10 has an end portion formed with an outwardly extending locking portion 11 locked onto the locking portion 42 of the second cutting member 40 by fastening members 52. The locking portion 11 of the second handle 10 is formed with a positioning recess 110 to receive the locking portion 42 of the second cutting member 40.

The gardening shears further comprise an elastic member 60 mounted between the first handle 20 and the second handle 10, and a fixing member 61 mounted on the first handle 20 and located between the mounting seat 21 and the end portion of the first handle 20.

In operation, referring to FIGS. 1–4, when a user exerts a force on the first handle 20 and the second handle 10, the first handle 20 and the second handle 10 are movable toward each other. At this time, the mounting seat 21 is driven by the first handle 20 to move the first cutting member 30 by connection between the pivot bore 32 of the first cutting member 30 and the drive arm 23 of the mounting seat 21, and the second cutting member 40 is driven by the second handle 10, so that the first cutting member 30 and the second cutting member 40 are movable toward each other until the first blade 33 of the first cutting member 30 abuts the second blade 41 of the second cutting member 40 so as to cut a workpiece, such as the branch or the like. In such a manner, the first handle 20 and the second handle 10 perform a first-stage linkage action.

At the same time, when the second cutting member 40 is movable toward the first cutting member 30, the linking rod 44 of the second cutting member 40 is movable in the adjusting slot 31 of the first cutting member 30 to push the first end of the first cutting member 30 upward to drive the first cutting member 30 to pivot about the drive arm 23 of the mounting seat 21 to push the first blade 33 of the first cutting member 30 downward, so that the first blade 33 of the first cutting member 30 is further movable toward the second blade 41 of the second cutting member 40 so as to enhance the cutting force of the first cutting member 30 and the second cutting member 40, thereby enhancing the working efficiency of the gardening shears and thereby saving the user's manual work. In such a manner, the first cutting member 30 and the second cutting member 40 perform a second-stage linkage action by the connection between the linking rod 44 of the second cutting member 40 and the adjusting slot 31 of the first cutting member 30.

Accordingly, when the second cutting member 40 is movable toward the first cutting member 30 to perform the cutting action, the linking rod 44 of the second cutting member 40 pushes the first end of the first cutting member 30 upward to drive the first cutting member 30 to pivot about the drive arm 23 of the mounting seat 21 to push the first blade 33 of the first cutting member 30 downward, so that the first blade 33 of the first cutting member 30 is further movable toward the second blade 41 of the second cutting member 40 so as to enhance the cutting force of the first cutting member 30 and the second cutting member 40, thereby enhancing the working efficiency of the gardening shears. In addition, the gardening shears have a two-stage linkage action, so that the gardening shears can provide a larger cutting force, thereby facilitating a user performing the cutting action, and thereby greatly saving the user's manual work. Further, the linking rod 44 of the second cutting member 40 is movable in the adjusting slot 31 of the first cutting member 30 to adjust travel of the first cutting member 30, so that the first cutting member 30 is movable smoothly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A pair of gardening shears, comprising:
 a first handle having an end portion formed with a mounting seat, the mounting seat having a first end formed with a pivot hole and a second end formed with a drive arm;
 a first cutting member pivotally mounted on the mounting seat and having a first end formed with an adjusting slot, a mediate portion formed with a pivot bore pivotally mounted on the drive arm of the mounting seat and a second end formed with a first blade;
 a second cutting member pivotally mounted on the mounting seat and having a first end formed with a pivot hole pivotally mounted on the pivot hole of the mounting seat, a mediate portion formed with a linking rod mounted in the adjusting slot of the first cutting member and a second end formed with a second blade aligning with the first blade of the first cutting member;
 a second handle secured on the first end of the second cutting member to move the second cutting member and movable relative to the first handle.

2. The gardening shears in accordance with claim 1, wherein the pivot hole of the mounting seat is located adjacent to the end portion of the first handle.

3. The gardening shears in accordance with claim 1, wherein the mounting seat has a recessed portion for mounting the drive arm.

4. The gardening shears in accordance with claim 3, wherein the drive arm is protruded outwardly from an inner side of the recessed portion of the mounting seat.

5. The gardening shears in accordance with claim 1, wherein the second end of the first cutting member is protruded outwardly from the mounting seat.

6. The gardening shears in accordance with claim 3, wherein the first cutting member is received in the recessed portion of the mounting seat.

7. The gardening shears in accordance with claim 1, wherein the adjusting slot of the first cutting member has an elongated shape.

8. The gardening shears in accordance with claim 1, wherein the adjusting slot of the first cutting member is located adjacent to the pivot hole of the mounting seat.

9. The gardening shears in accordance with claim 1, wherein the second end of the second cutting member is protruded outwardly from the mounting seat.

10. The gardening shears in accordance with claim 1, wherein the linking rod of the second cutting member is pivotally and movably mounted in the adjusting slot of the first cutting member.

11. The gardening shears in accordance with claim 1, wherein the linking rod of the second cutting member is protruded outwardly from an inner side of the second cutting member.

12. The gardening shears in accordance with claim 1, wherein the first cutting member is located between the mounting seat and the second cutting member.

13. The gardening shears in accordance with claim 1, further comprising a pivot bolt extended through the pivot hole of the mounting seat and the pivot hole of the second cutting member so that the second cutting member is pivotally mounted on the mounting seat, and a locking nut screwed onto the pivot bolt and rested on the pivot bolt.

14. The gardening shears in accordance with claim 1, wherein the first end of the second cutting member is formed with an outwardly extending locking portion, and the second handle has an end portion formed with an outwardly extending locking portion locked onto the locking portion of the second cutting member by fastening members.

15. The gardening shears in accordance with claim 14, wherein the locking portion of the second handle is formed with a positioning recess to receive the locking portion of the second cutting member.

16. The gardening shears in accordance with claim 1, further comprising an elastic member mounted between the first handle and the second handle, and a fixing member mounted on the first handle and located between the mounting seat and the end portion of the first handle.

17. The gardening shears in accordance with claim 1, wherein the mounting seat is driven by the first handle to move the first cutting member by connection between the pivot bore of the first cutting member and the drive arm of the mounting seat.

18. The gardening shears in accordance with claim 1, wherein when the second cutting member is movable toward the first cutting member, the linking rod of the second cutting member is movable in the adjusting slot of the first cutting member to push the first end of the first cutting member upward to drive the first cutting member to pivot about the drive arm of the mounting seat to push the first blade of the first cutting member downward, so that the first blade of the first cutting member is movable toward the second blade of the second cutting member.

\* \* \* \* \*